United States Patent

Yamaguchi

[11] Patent Number: 6,024,551
[45] Date of Patent: Feb. 15, 2000

[54] INJECTION MOLD FOR GOLF BALLS

[75] Inventor: Takehiko Yamaguchi, Chichibu, Japan

[73] Assignee: Bridgestone Sports Co., Ltd., Tokyo, Japan

[21] Appl. No.: 09/103,931

[22] Filed: Jun. 25, 1998

[30] Foreign Application Priority Data

Jun. 27, 1997 [JP] Japan ..................... 9-187575

[51] Int. Cl.$^7$ .................... B29C 45/14; B29C 45/36
[52] U.S. Cl. ................. 425/116; 264/278; 264/328.12; 425/120; 425/125; 425/573
[58] Field of Search .................. 425/116, 117, 425/120, 125, 127, 573; 264/278, 328.12

[56] References Cited

U.S. PATENT DOCUMENTS 2,031,786  2/1936  Oldham ..................... 425/573
2,376,085  5/1945  Radford et al. ................. 425/116

*Primary Examiner*—Robert Davis
*Attorney, Agent, or Firm*—Sughrue, Mion, Zinn, Macpeak & Seas, PLLC

[57] ABSTRACT

Golf balls are prepared using an injection mold defining a spherical cavity and having a plurality of gates for admitting a molding material into the cavity therethrough. The gates are arranged such that the maximum flow distance that the molding material admitted from each gate moves along the cavity-defining wall may be not greater than $\sqrt{3}\pi r/4$ wherein r is a radius of the cavity. Golf balls of quality having a cover with a uniform gage of 1 mm or less can be molded without short shots.

10 Claims, 6 Drawing Sheets

INJECTION MOLD FOR GOLF BALLS

BACKGROUND OF THE INVENTION

1. Field of the Invention

This invention relates to an injection mold for use in the manufacture of golf balls. More particularly, it relates to an injection mold for golf balls defining a spherical cavity therein wherein a plurality of gates open to the cavity are three-dimensionally arranged so that golf balls having a cover of a uniform gage can be molded without short shots.

2. Prior Art

In the prior art, two-piece solid golf balls are customarily prepared using injection molds. Referring to FIGS. 11 and 12, a method for injection molding a cover around a core is described. FIG. 11 is a cross sectional view of an injection mold defining a spherical cavity, and FIG. 12 is an imaginary perspective view of the spherical cavity of the mold. The injection mold 1 for molding a cover around a core includes an upper mold section 1a and a lower mold section 1b having inner walls which define a spherical cavity 2 when the mold sections are mated at a parting plane P. The inner walls are provided with dimple-forming protrusions (not shown). It is noted that the parting plane or line P between the upper and lower mold sections 1a and 1b corresponds to an equator plane or line of the cavity. A plurality of support pins 4 are vertically extended through the upper and lower mold sections 1a and 1b (four pins in each of the upper and lower mold sections in FIG. 11). A plurality of gates 5 (eight in FIG. 11) are disposed along the parting line P (or near the parting line P in the case of tunnel gates). In preparing a golf ball, a core 3 is placed in the cavity 2 as an insert. The core 3 is held in place by the support pins 4. A cover molding material is injected into the space between the core 3 and the cavity-defining wall through the gates 5. Immediately before the cover molding material is injected or at the same time as the completion of injection, the support pins 4 are withdrawn until their distal ends are flush with the cavity-defining wall. In this way, the core 3 is enclosed with a cover having a multiplicity of dimples. It is noted that in FIG. 11, a pin 6 is received in a hole 7 to define a venting space 8 at each of opposite poles.

When the cover molding material is injected into the space between the core 3 and the cavity-defining wall through each gate 5, the material diffuses and moves radially along the cavity-defining wall as shown by arrows in FIG. 12 and eventually converges at the deepest position of the cavity (in proximity to the north and south poles). Of the flow distances that the molding material moves, the length designated L between the gate and the pole (north or south pole) is the longest. In this example, this maximum flow distance L is approximately equal to a quarter of the circumference of the spherical cavity, that is, $2\pi r/4$.

Longitudinal boundary lines (or imaginary weld lines) U indicate the positions at which the molding material injected from adjacent gates merge with each other after the completion of injection. The surface area that is covered by the molding material admitted through each gate is the surface area circumscribed by two adjacent longitudinal boundary lines U, that is, the hatched region in FIG. 12. In this example, this surface area coverage is approximately equal to or greater than ⅛ of the overall surface area of the cavity.

In the prior art injection mold 1 mentioned above, however, a plurality of gates 5 (eight in the illustrated example) are equidistantly spaced along the parting line (or equator line) P between the mold sections. Even when tunnel gates are employed, they are disposed in close proximity to the parting line P for the convenience of gate cutting. As a result, an intense injection pressure of typically 400 to 2,000 kg/cm² or more is applied to the core in a perpendicular direction, thereby deforming the core to expand it in polar directions into a rugby ball shape. Consequently, the spaces at the deepest positions of the cavity become narrow so that the molding material may not fully penetrate thereto, resulting in short shots. Particularly when it is desired to mold a thin cover (with a gage of less than 1 mm), the injection pressure must be higher and as a consequence, the space between the core and the cavity wall is substantially blocked. Molding is no longer possible.

Moreover, since the gates are disposed along the parting line P, the maximum flow distance L of the molding material becomes longer. In addition, the surface area coverage of the molding material from each gate also becomes larger, requiring a longer time for filling. Then the molding material can lower its fluidity before the completion of filling, failing to mold a cover of a uniform gage. Particularly near the polar positions where the molding material converges, the molding material can substantially lower its fluidity and even solidify before filling, resulting in molding failure.

SUMMARY OF THE INVENTION

Therefore, an object of the invention is to provide a novel and improved injection mold for golf balls in which gates are disposed in a three-dimensionally appropriate arrangement relative to the spherical cavity so that golf balls having a cover of a uniform gage can be molded without short shots.

The present invention pertains to an injection mold for golf balls defining a spherical cavity by its inner wall and having a plurality of gates open to the cavity for admitting a molding material into the cavity therethrough. According to the invention, the gates are arranged such that the maximum flow distance that the molding material admitted from each gate moves along the cavity-defining wall may be not greater than $\sqrt{3}\pi r/4$ wherein r is a radius of the cavity.

The cavity has a center, an equator plane or line and opposite poles. In one preferred embodiment, four to twelve gates are arranged substantially on the equator line at substantially equal intervals and two gates are arranged at the opposite poles.

In another preferred embodiment, four to twelve gates are arranged at substantially equal intervals on a latitude line on each hemisphere having an angle of about 30° to about 45° between a straight line passing the cavity center and the equator plane. Further preferably, a flowpath for the molding material in communication with each gate is directed at the position of that gate to an axis connecting the opposite poles.

In a further preferred embodiment, at least 8 gates are arranged, and the surface area that is covered by the molding material admitted through each gate is not greater than ⅛ of the overall surface area of the cavity.

According to the invention, in an injection mold defining a spherical cavity and having a plurality of gates open to the cavity, the gates are disposed in a three-dimensionally appropriate arrangement relative to the cavity, thereby effectively solving the gate arrangement and molding material filling problems of prior art molds.

More particularly, in an injection mold defining a spherical cavity and having a plurality of gates open to the cavity, when (1) the gates are arranged such that the maximum flow distance that the molding material admitted from each gate moves along the cavity-defining wall may be not greater than $\sqrt{3}\pi r/4$ wherein r is the cavity radius, and preferably (2) the gates are arranged such that the surface area that is covered by the molding material admitted through each gate is not greater than ⅛ of the overall surface area of the cavity, a three-dimensionally appropriate arrangement adapted to the cavity is established. This gate arrangement reduces and disperses the injection pressure applied to the core, thereby preventing the core from being deformed and effectively eliminating short shots. The possibility of the molding material losing its fluidity and solidifying before the completion of filling is minimized. Short filling is eliminated even at the position where molding material portions from adjacent gates merge with each other. As a consequence, a cover of a uniform gage can be molded.

Using the injection mold of the invention, golf balls which are of quality in that the cover has a uniform gage can be molded without short shots even when the cover is as thin as a gage of 1 mm or less.

DETAILED DESCRIPTION OF THE INVENTION

Figure 11:
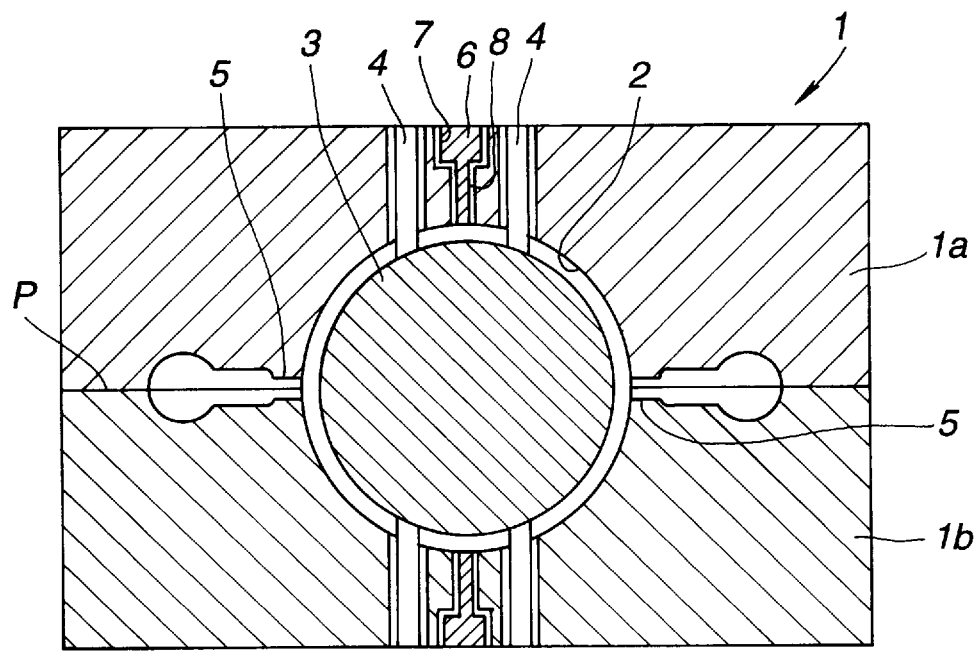
FIG. 11 is a cross-sectional view of a prior art injection mold defining a spherical cavity.
Figure 12:
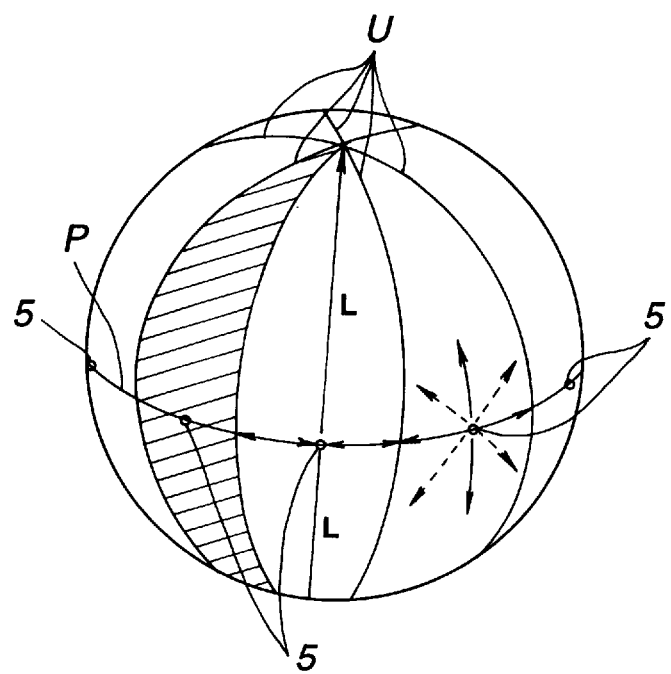
FIG. 12 is an imaginary perspective view of the spherical cavity of the prior art mold.

Referring to FIGS. 1 to 10, several embodiments of the invention are described. In these figures, the same parts as in FIGS. 11 and 12 are designated by the same reference numerals and their description is omitted.

Figure 1:
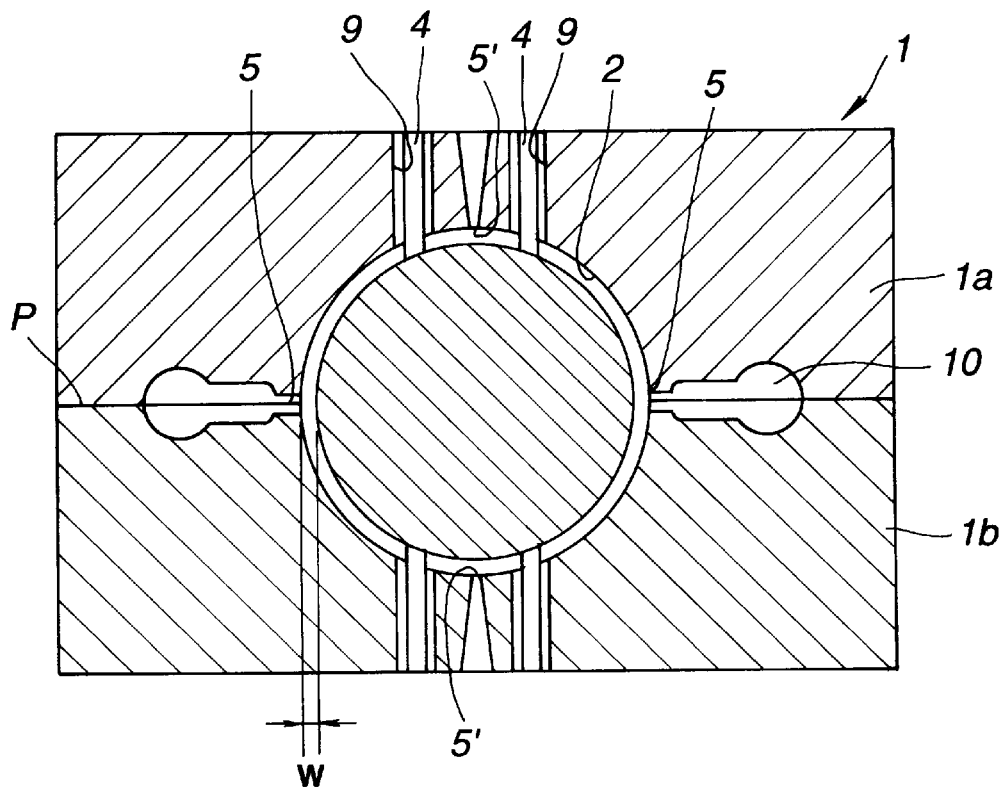
FIG. 1 is a cross-sectional view of an injection mold defining a spherical cavity according to a first embodiment of the invention.
Figure 2:
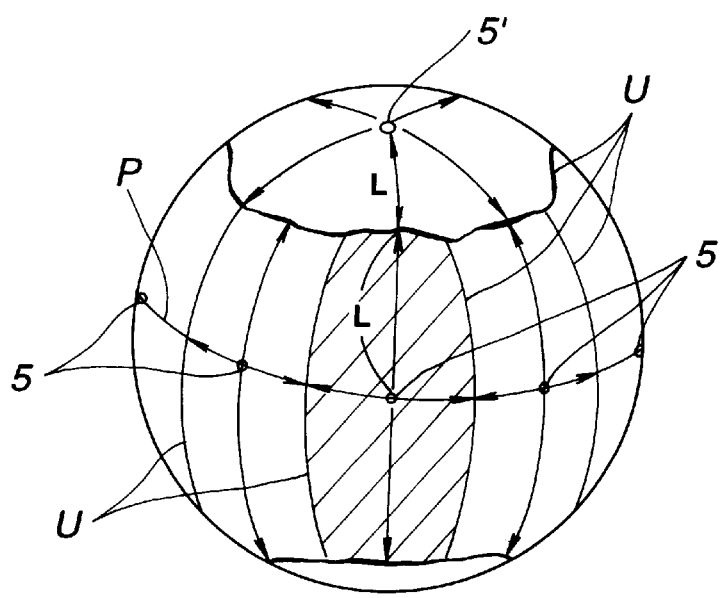
FIG. 2 is an imaginary perspective view of the spherical cavity of the mold of FIG. 1.

FIG. 1 is a cross-sectional view of an injection mold defining a spherical cavity for molding golf balls according to a first embodiment of the invention. FIG. 2 is an imaginary perspective view of the spherical cavity of the mold of FIG. 1, showing the positions of gates and the maximum flow distance L of molding material.

The injection mold 1 according to the invention includes an upper mold section 1$a$ and a lower mold section 1$b$ which are removably mated to define therein a spherical cavity 2 having a radius r. The inner walls of the mold sections defining the cavity 2 are provided with dimple-forming protrusions (not shown).

The mold 1 is provided with a plurality of gates 5 open to the cavity 2 for admitting a molding material into the cavity therethrough. According to the invention, four to twelve, especially six to eight, gates are arranged at substantially equal intervals along the parting line P between the upper and lower mold sections 1$a$ and 1$b$ (that is, the equator line of the spherical cavity), and two gates 5' are arranged at opposite poles of the cavity (that is, the north and south poles of the spherical cavity). Though not shown, venting means may be provided on weld lines. Venting is also possible utilizing the spaces between support pins 4 and support pin-receiving holes 9. In this first embodiment, eight gates 5 are arranged at equal intervals along the parting line P, and one gate 5' is disposed at each of the north and south poles of the spherical cavity. That is, ten gates are arranged in total.

The gates 5 on the parting line P and the gates 5' at the opposite poles may be identical or different in gate diameter and internal pressure upon injection (injection pressure). For the purpose of equalizing the injection pressures applied to the core so as to prevent the core from being deformed or deflected, it is desirable that all the gates have an identical diameter and injection pressure. Typically, the gate diameter is about 0.5 mm to about 1.5 mm and the injection pressure is about 700 to 1,400 kg/cm$^2$.

When the cover molding material is injected into the space between the core 3 and the cavity-defining wall through each gate 5, the material diffuses and moves radially on the cavity wall. Concerning the flow distances that the molding material moves and converges (or merges), the distance L between the gate and the farthest position of the converged material from the gate is the longest. The maximum flow distance L of molding material becomes an index for evaluating the extent of filling during injection molding and the appropriateness of gate arrangement.

In the injection mold of the invention, the gates are arranged such that the maximum flow distance L of molding material may be not greater than $\sqrt{3}\pi r/4$ wherein r is the cavity radius. Preferably, the gates are arranged such that the maximum flow distance L may range from $0.2\pi r$ to $0.4\pi r$. The maximum flow distance L of not greater than $\sqrt{3}\pi r/4$ means that the flow distance of molding material from the gate to the converging (or merging) position does not exceed $\sqrt{3}/8$ (=1/4.6) of the circumference ($2\pi r$) of the spherical cavity. The maximum flow distance L of not greater than $\sqrt{3}\pi r/4$ is substantially shorter than the maximum flow distance ($2\pi r/4 = 0.5\pi r$) of the prior art mold (shown in FIGS. 11 and 12). If the maximum flow distance L exceeds $\sqrt{3}\pi r/4e$, the molding material lowers its fluidity and even solidifies before completion of filling, resulting in short shots in proximity to the converging positions and failing to mold a cover of a uniform gage. In this first embodiment, the maximum flow distance L is about $2\pi r/8$ wherein r is the cavity radius.

Further preferably, in the injection mold according to the invention, the gates are arranged such that the surface area that is covered by the molding material admitted through each gate, namely the surface area that is circumscribed by two adjacent imaginary weld lines U indicating the positions at which the molding material portions injected from adjacent gates merge after the completion of injection (the hatched region in FIG. 2) is not greater than ⅛, more preferably equal to ⅛ to ⅟₁₆ of the overall surface area of the cavity. If the surface area coverage of the molding material from one gate exceeds ⅛ of the overall surface area of the cavity, there is a possibility that the surface area to be covered is too large and the gate arrangement be inappropriate, resulting in short shots. In this first embodiment, the surface area coverage of the molding material from one gate is ⅟₁₀ of the overall surface area of the cavity.

In the injection mold of the invention, the gates are arranged to meet the requirements of the maximum flow distance L and the surface area coverage of the molding material per gate, thereby achieving a three-dimensionally appropriate gate arrangement adapted for the cavity geometry to mold a cover of a uniform gage without short shots.

In the first embodiment, the distance w (FIG. 1) of the space between the core and the cavity wall, corresponding to the thickness of the injection molded material or cover, is usually 1 mm or less and can be reduced to 0.5 mm at minimum.

The injection mold of the invention is suitable for the manufacture of a two-piece golf ball consisting of a core and a cover, and more particularly for forming a cover layer around a core and generally, for forming an outermost layer. Besides, the invention is, of course, applicable to the molding of a cover of wound golf balls, the molding of an intermediate layer and a cover of multi-layer structure golf balls, and the molding of one-piece solid golf balls.

The injection mold of the invention is not limited to the first embodiment. In the injection mold according to another preferred embodiment of the invention, four to twelve, preferably six to eight, gates are arranged at substantially equal intervals along a latitude line on each hemisphere in which the angle between a straight line extending therefrom and passing the center of the cavity and the equator plane P is about 30° to about 45°, and a flowpath 11 for the molding material extending to a gate from a ring runner 10 surrounding the cavity on the equator plane is directed, at the position of that gate, toward an axis connecting the opposite poles of the cavity. With this construction, a three-dimensionally appropriate gate arrangement adapted for the cavity geometry is established as well. Preferred examples of this mold are illustrated below.

Figure 3:
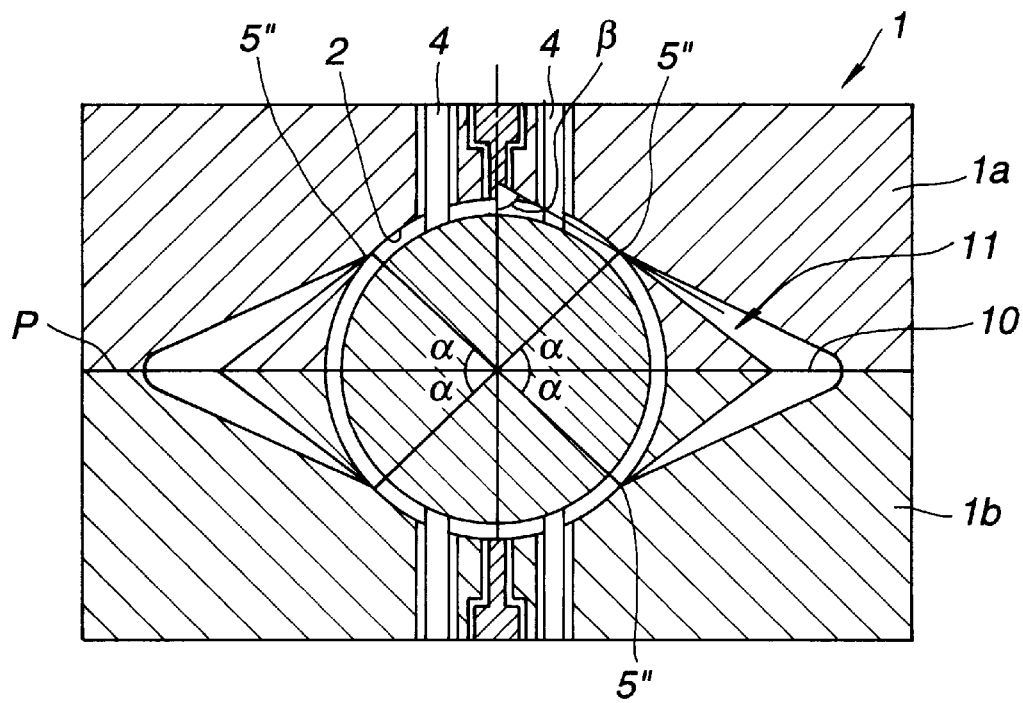
FIG. 3 is a cross-sectional view of an injection mold defining a spherical cavity according to a second embodiment of the invention.
Figure 4:
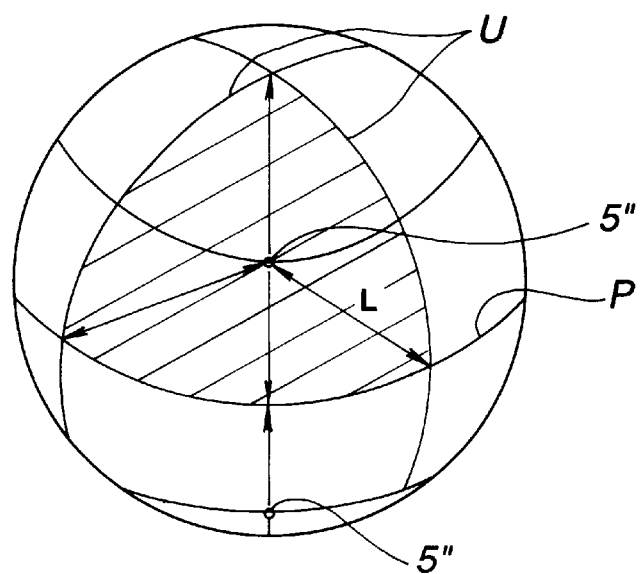
FIG. 4 is an imaginary perspective view of the spherical cavity of the mold of FIG. 3.

FIG. 3 is a cross-sectional view of an injection mold defining a spherical cavity according to a second embodiment of the invention. FIG. 4 is an imaginary perspective view of the spherical cavity of the mold of FIG. 3. In the mold of the second embodiment, instead of arranging the gates on the equator plane and at the opposite poles as in the first embodiment, eight gates 5" are arranged at equal longitudinal intervals at positions on the cavity wall spaced an angle $\alpha=45°$ from the equator plane P. That is, four gates 5" are arranged at equal intervals on each of the latitude lines at north latitude 45° and south latitude 45° (parallel to the equator line). The total number of gates 5" is eight (8). A flowpath 11 for the molding material extending obliquely to a gate 5" from a ring runner 10 surrounding the cavity on the equator plane P is directed, especially in proximity to that gate 5", to the pole (north or south pole) on the same side as that gate such that the incident angle $\beta$ of that gate 5" to the cavity is 30°. In this second embodiment, the maximum flow distance L of molding material is about $0.36\pi r$, and the surface area coverage of the molding material per gate (depicted by the hatched region in FIG. 4) is not greater than about ⅛ of the overall surface area of the cavity.

Figure 5:
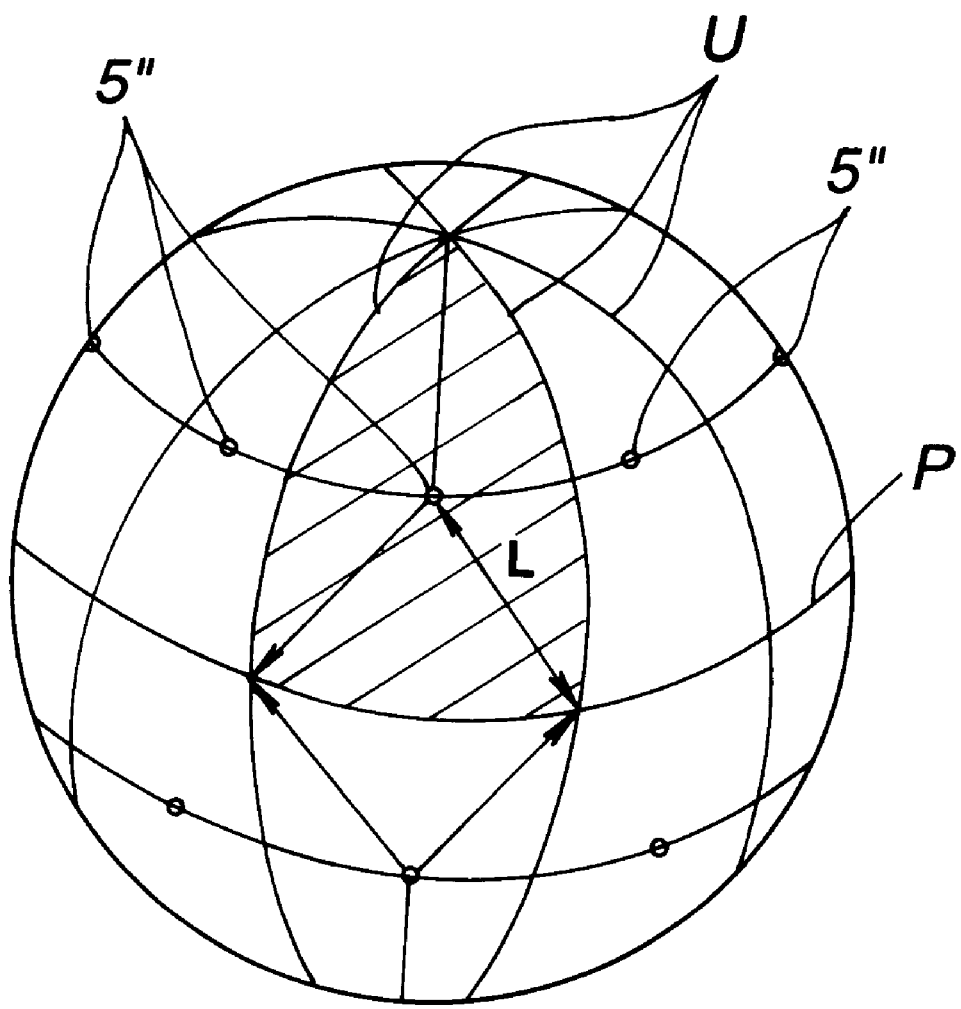
FIG. 5 is an imaginary perspective view of the spherical cavity of a mold according to a third embodiment of the invention.

FIG. 5 is an imaginary perspective view of a spherical mold cavity according to a third embodiment of the invention. The third embodiment is the same as the second embodiment of FIGS. 3 and 4 except that eight gates 5" are arranged at equal intervals on each of the latitude lines at north latitude 45° and south latitude 45° (parallel to the equator line). The total number of gates 5" is sixteen (16). In the third embodiment, the maximum flow distance L of molding material is about $0.2\pi r$, and the surface area coverage of the molding material per gate (depicted by the hatched region in FIG. 5) is not greater than about 1/16 of the overall surface area of the cavity.

Figure 6:
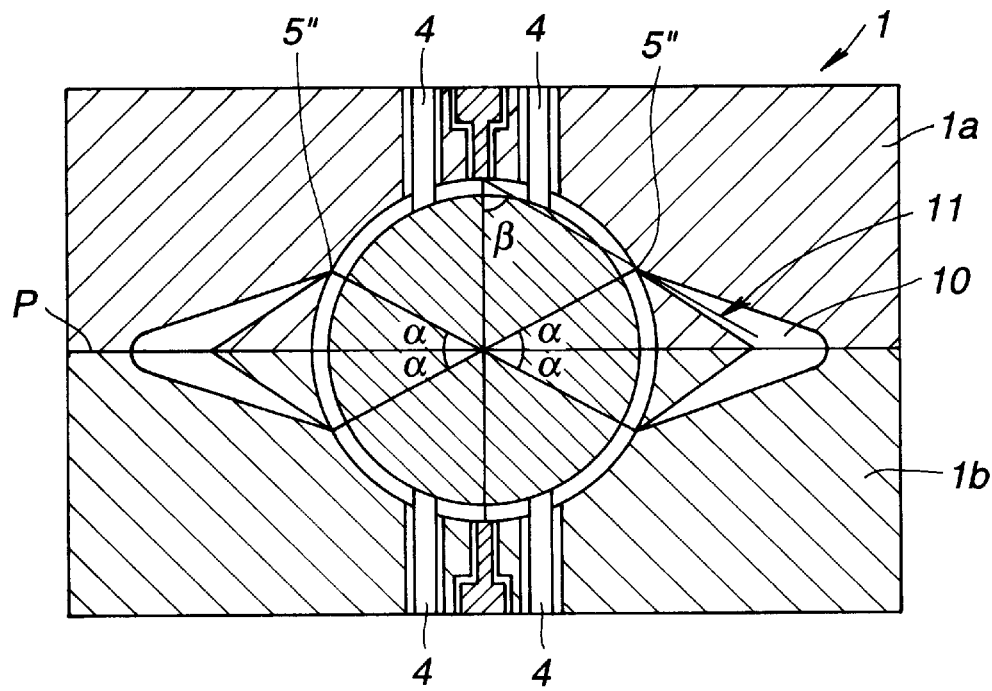
FIG. 6 is a cross-sectional view of an injection mold defining a spherical cavity according to a fourth embodiment of the invention.
Figure 7:
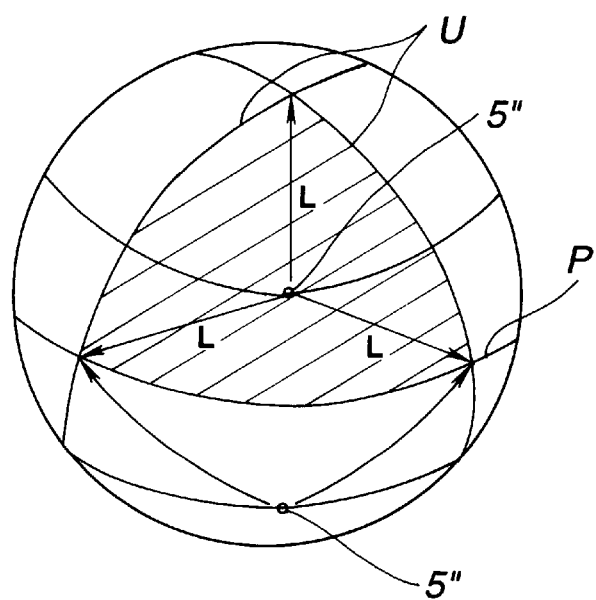
FIG. 7 is an imaginary perspective view of the spherical cavity of the mold of FIG. 6.

FIG. 6 is a cross-sectional view of an injection mold defining a spherical cavity according to a fourth embodiment of the invention. FIG. 7 is an imaginary perspective view of the spherical cavity of the mold of FIG. 6. In the mold of the fourth embodiment, eight gates 5" are arranged at equal longitudinal intervals at positions on the cavity wall spaced an angle $\alpha=30°$ from the equator plane P. That is, four gates 5" are arranged at equal intervals on each of the latitude lines at north latitude 30° and south latitude 30° (parallel to the equator line). The total number of gates 5" is eight (8). The flowpath 11 for the molding material extending obliquely to a gate 5" from the ring runner 10 surrounding the cavity on the equator plane P is directed, especially in proximity to that gate 5", to the pole (north or south pole) on the same side as that gate such that the incident angle $\beta$ of that gate 5" to the cavity is 45°. In the fourth embodiment, the maximum flow distance L of molding material is about $0.43\pi r$, and the surface area coverage of the molding material per gate (depicted by the hatched region in FIG. 7) is equal to ⅛ of the overall surface area of the cavity. Understandably, this fourth embodiment can be further modified as in the third embodiment such that the number of gates is eight on each hemisphere (16 gates in total).

Also useful in the practice of the invention are molds resulting from combinations of the first embodiment with the second to fourth embodiments, that is, molds in which gates are arranged on the equator line P, the latitude lines with an angle $\alpha=30°$ or 45°, and the opposite poles.

With respect to the relation of the molding material flowpath 11 and gates 5", to the cavity 2, modifications from the above-illustrated embodiments are possible. In one modification shown in FIG. 8, the flowpath 11 extends linearly to the proximity of the gate 5" as in FIG. 3 or 6, but is bent at its distal end such that the gate 5" is directed to the center C of the cavity 2.

Figure 8:
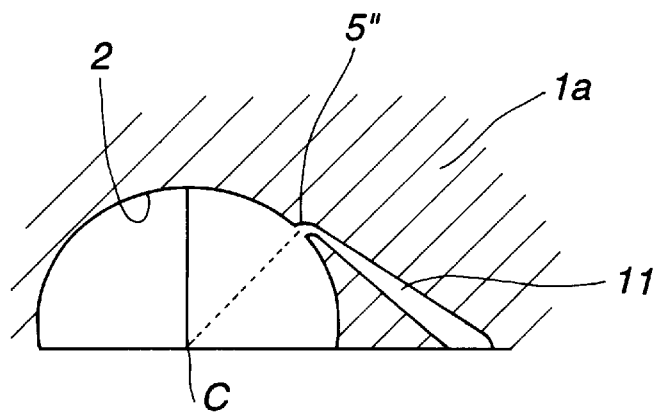
FIGS. 8, 9 and 10 are fragmental cross-sectional views of an injection mold according to the invention, showing different gate and runner configurations.
Figure 9:
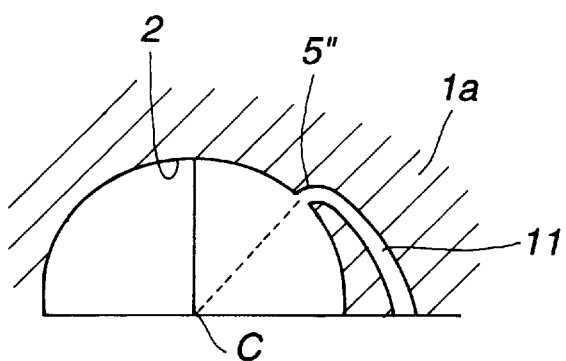

In another embodiment shown in FIG. 9, the flowpath 11 extends curvilinearly along the cavity wall and is bent at its distal end such that the gate 5" is directed to the center C of the cavity 2 as in the case of FIG. 8.

Figure 10:
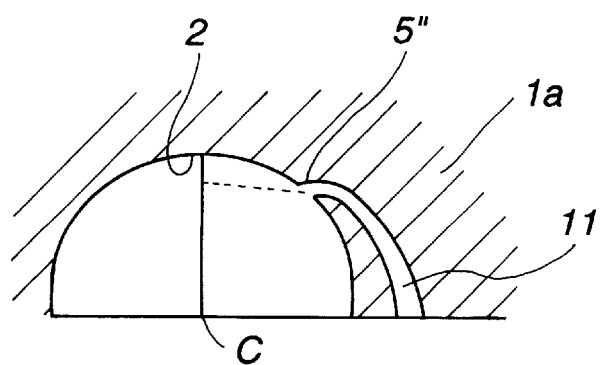

In a further embodiment shown in FIG. 10, the shape and disposition of the flowpath 11 are the same as in FIG. 9, but the gate 5" is directed to any desired intermediate position on an axis connecting the opposite poles and between the center C and the north or south pole.

The runner in flow communication with the gates is not critical. Any of well-known runners such as hot runners and cold runners may be used.

Using the injection mold of the invention, golf balls of quality having a cover of a uniform gage can be molded without short shots, even when the cover is as thin as 1 mm or less.

Although some preferred embodiments have been described, many modifications and variations may be made thereto in the light of the above teachings. It is therefore to be understood that within the scope of the appended claims, the invention may be practiced otherwise than as specifically described.

I claim:

1. In an injection mold for golf balls defining a spherical cavity by its inner wall and having a plurality of gates open to the cavity for admitting a molding material into the cavity therethrough, the improvement wherein the gates are arranged such that the maximum flow distance that the molding material admitted from each gate moves along the cavity-defining wall may be not greater than $\sqrt{3}\pi r/4$ wherein r is a radius of the cavity, and said cavity has a center, an equator plane and opposite poles, four to twelve gates are arranged at substantially equal intervals on a latitude line on each hemisphere having an angle of about 30° to about 45° between a straight line passing the cavity center and the equator plane.

2. The injection mold of claim 1 wherein a flowpath for the molding material in communication with each gate is directed at the position of said gate to an axis connecting the opposite poles.

3. The injection mold of claim 1 wherein the surface area covered by the molding material admitted through each gate is not greater than 1/8 of the overall surface area of the cavity.

4. In an injection mold for golf balls defining a spherical cavity by its inner wall and having a plurality of gates open to the cavity for admitting a molding material into the cavity therethrough, the improvement wherein provided that cavity has a center, an equator plane and opposite poles, six to eight gates are arranged on the equator line of the spherical cavity at substantially equal intervals and two gates are arranged at the opposite poles thereof and the maximum flow distance that the molding material admitted from each gate moves along the cavity-defining wall may be not greater than $\sqrt{3}\pi r/4$ wherein r is a radius of the cavity, and the surface area covered by the molding material admitted through each gate is not greater than 1/8 of the overall surface area of the cavity so that the molding material admitted from each gate can flow in a narrow space having a distance w of 0.5 to 1 mm between a core set in the cavity and cavity wall.

5. In an injection mold for golf balls defining a spherical cavity by its inner wall and having a plurality of gates open to the cavity for admitting a molding material into the cavity therethrough, the improvement wherein provided that cavity has a center, an equator plane and opposite poles, four gates are arranged at equal intervals on each of the latitude lines at north latitude 45° and south latitude 45° when latitude is defined as the angle between a straight line passing the cavity center and the equator plane and the maximum flow distance that the molding material admitted from each gate moves along the cavity-defining wall is about $0.36\pi r$ wherein r is a radius of the cavity, and the surface area covered by the molding material admitted through each gate is not greater than 1/8 of the overall surface area of the cavity so that the molding material admitted from each gate can flow in a narrow space having a distance w of 0.5 to 1 mm between a core set in the cavity and cavity wall.

6. The injection mold of claim 5, wherein a flowpath for the molding material in communication with each gate is directed at the position of said gate to an axis connecting the opposite poles.

7. In an injection mold for golf balls defining a spherical cavity by its inner wall and having a plurality of gates open to the cavity for admitting a molding material into the cavity therethrough, the improvement wherein provided that cavity has a center, an equator plane and opposite poles, eight gates are arranged at equal intervals on each of the latitude lines at north latitude 45° and south latitude 45° when latitude is defined as the angle between a straight line passing the cavity center and the equator plane and the maximum flow distance that the molding material admitted from each gate moves along the cavity-defining wall is about $0.2\pi r$ wherein r is a radius of the cavity, and the surface area covered by the molding material admitted through each gate is not greater than 1/16 of the overall surface area of the cavity so that the molding material admitted from each gate can flow in a narrow space having a distance w of 0.5 to 1 mm between a core set in the cavity and cavity wall.

8. The injection mold of claim 7, wherein a flowpath for the molding material in communication with each gate is directed at the position of said gate to an axis connecting the opposite poles.

9. In an injection mold for golf balls defining a spherical cavity by its inner wall and having a plurality of gates open to the cavity for admitting a molding material into the cavity therethrough, the improvement wherein provided that cavity has a center, an equator plane and opposite poles, four gates are arranged at equal intervals on each of the latitude lines at north latitude 30° and south latitude 30° when latitude is defined as the angle between a straight line passing the cavity center and the equator plane and the maximum flow distance that the molding material admitted from each gate moves along the cavity-defining wall is about $0.43\pi r$ wherein r is a radius of the cavity, and the surface area covered by the molding material admitted through each gate is not greater than 1/8 of the overall surface area of the cavity so that the molding material admitted from each gate can flow in a narrow space having a distance w of 0.5 to 1 mm between a core set in the cavity and cavity wall.

10. The injection mold of claim 9, wherein a flowpath for the molding material in communication with each gate is directed at the position of said gate to an axis connecting the opposite poles.

* * * * *